US009690441B2

(12) United States Patent
Kim et al.

(10) Patent No.: US 9,690,441 B2
(45) Date of Patent: Jun. 27, 2017

(54) METHOD AND APPARATUS FOR MANAGING MESSAGE

(71) Applicant: Samsung Electronics Co., Ltd., Gyeonggi-do (KR)

(72) Inventors: Jinyong Kim, Seoul (KR); Yongho Choi, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 288 days.

(21) Appl. No.: 13/706,539

(22) Filed: Dec. 6, 2012

(65) Prior Publication Data

US 2013/0159878 A1 Jun. 20, 2013

(30) Foreign Application Priority Data

Dec. 19, 2011 (KR) .......................... 10-2011-0137165

(51) Int. Cl.
*G06F 3/048* (2013.01)
*G06F 3/0482* (2013.01)
*H04W 4/12* (2009.01)
*H04M 1/725* (2006.01)
*H04L 12/58* (2006.01)
(Continued)

(52) U.S. Cl.
CPC ............ *G06F 3/048* (2013.01); *G06F 3/0482* (2013.01); *G06F 3/0485* (2013.01); *G06F 3/04883* (2013.01); *G06Q 10/107* (2013.01); *H04L 51/16* (2013.01); *H04M 1/72547* (2013.01);
(Continued)

(58) Field of Classification Search
CPC .. G06Q 10/107; G06F 3/048; H04M 1/72547; H04L 51/16; H04L 51/00
See application file for complete search history.

(56) References Cited

U.S. PATENT DOCUMENTS 5,815,142 A * 9/1998 Allard .................. G06F 3/0488
345/173
6,493,703 B1 * 12/2002 Knight .............. G06F 17/30702
(Continued)

FOREIGN PATENT DOCUMENTS

JP 2005-196773 A 7/2005
JP 2005-322046 A 11/2005
(Continued)

OTHER PUBLICATIONS

Receiving and Responding to Email Messages, Yahoo! UK Ltd., Oct. 25, 2009. [online], [retrieved on Dec. 22, 2014]. Retrieved from the Internet <URL: https://web.archive.org/web/20091025190345/http:/help.yahoo.com/uk/bt/tutorials/mmail/mm_receive6.html>.*
(Continued)

*Primary Examiner* — Amy M Levy
(74) *Attorney, Agent, or Firm* — Cha & Reiter, LLC.

(57) ABSTRACT

A method and apparatus are provided for conveniently managing messages that are received from or sent to external devices through a network by a mobile device. At least one message is displayed and selected by a user for a further operation. Attribute information of the selected message is checked in a message history database. Based on the checked attribute information, a message related to the selected message is displayed. The selected message may be a previously marked message and the related message may be an unmarked message.

19 Claims, 11 Drawing Sheets

(51) Int. Cl.
*G06Q 10/10* (2012.01)
*G06F 3/0485* (2013.01)
*G06F 3/0488* (2013.01)

(52) U.S. Cl.
CPC ......... *H04L 51/32* (2013.01); *H04M 2250/22* (2013.01); *H04W 4/12* (2013.01)

(56) References Cited

U.S. PATENT DOCUMENTS

| | | | | |
|---|---|---|---|---|
| 7,035,903 | B1* | 4/2006 | Baldonado | H04L 12/5885 709/206 |
| 7,392,249 | B1* | 6/2008 | Harris | G06F 17/30864 |
| 8,171,426 | B2* | 5/2012 | Loverin et al. | 715/823 |
| 2003/0064707 | A1* | 4/2003 | Yoneyama | G06Q 10/107 455/412.1 |
| 2003/0177192 | A1* | 9/2003 | Umeki | G06F 17/30699 709/206 |
| 2003/0233419 | A1* | 12/2003 | Beringer | G06Q 10/107 709/206 |
| 2005/0004989 | A1* | 1/2005 | Satterfield | G06Q 10/107 709/206 |
| 2005/0138002 | A1* | 6/2005 | Giacobbe | G06F 17/30067 |
| 2005/0144157 | A1* | 6/2005 | Moody | G06Q 10/107 |
| 2005/0144560 | A1 | 6/2005 | Gruen et al. | |
| 2005/0144571 | A1 | 6/2005 | Loverin et al. | |
| 2005/0160372 | A1* | 7/2005 | Gruen et al. | 715/810 |
| 2005/0222985 | A1* | 10/2005 | Buchheit | G06Q 10/107 |
| 2005/0234910 | A1* | 10/2005 | Buchheit | G06Q 10/107 |
| 2006/0031358 | A1* | 2/2006 | Canis | H04L 67/322 709/206 |
| 2007/0300169 | A1* | 12/2007 | Jones | G06F 17/211 715/764 |
| 2008/0036794 | A1* | 2/2008 | Weiser et al. | 345/689 |
| 2008/0065736 | A1* | 3/2008 | Gross | G06Q 10/107 709/207 |
| 2008/0126951 | A1* | 5/2008 | Sood et al. | 715/752 |
| 2008/0141146 | A1* | 6/2008 | Jones | H04L 12/1822 715/753 |
| 2008/0168386 | A1 | 7/2008 | Brinda et al. | |
| 2008/0215678 | A1* | 9/2008 | Coletrane | H04L 51/04 709/204 |
| 2008/0250023 | A1* | 10/2008 | Baker | G06F 17/30522 |
| 2008/0263157 | A1* | 10/2008 | Bhogal et al. | 709/206 |
| 2009/0007006 | A1* | 1/2009 | Liu et al. | 715/784 |
| 2009/0089381 | A1* | 4/2009 | Anderson | G06Q 10/107 709/206 |
| 2010/0044121 | A1* | 2/2010 | Simon | G06F 3/03547 178/18.03 |
| 2010/0070584 | A1* | 3/2010 | Chen et al. | 709/206 |
| 2010/0159967 | A1* | 6/2010 | Pounds | H04L 51/14 455/466 |
| 2010/0228812 | A1* | 9/2010 | Uomini | 709/203 |
| 2010/0235447 | A1* | 9/2010 | Goodman | G06Q 10/107 709/206 |
| 2011/0072363 | A1* | 3/2011 | Mandel | G06Q 10/107 715/752 |
| 2011/0246945 | A1* | 10/2011 | Caine et al. | 715/835 |
| 2011/0252362 | A1 | 10/2011 | Cho et al. | |
| 2012/0143931 | A1* | 6/2012 | Rosenberger | G06F 17/301 707/828 |
| 2012/0254740 | A1* | 10/2012 | Levien | G06F 17/00 715/255 |
| 2012/0272160 | A1* | 10/2012 | Spivack | G06Q 10/10 715/752 |
| 2012/0316962 | A1* | 12/2012 | Rathod | 705/14.54 |
| 2013/0072262 | A1* | 3/2013 | Mhun | H04M 1/72552 455/566 |
| 2013/0089243 | A1* | 4/2013 | Sauve et al. | 382/118 |
| 2013/0091439 | A1* | 4/2013 | Sirpal | G06F 3/1438 715/752 |
| 2013/0125062 | A1* | 5/2013 | Lee | G06F 3/04883 715/854 |

FOREIGN PATENT DOCUMENTS

| | | |
|---|---|---|
| JP | 2007-509430 A | 4/2007 |
| KR | 10-2008-0045948 A | 5/2008 |
| KR | 10-2009-0005741 A | 1/2009 |
| KR | 10-2010-0007228 A | 1/2010 |
| KR | 10-2010-0104299 A | 9/2010 |

OTHER PUBLICATIONS

Galitz, Wilbert O. The Essential Guide to User Interface Design (2002). Wiley Publishing.*

Nisida Munacika, Free, Simple, Convenient! A New Tool of Web 2.0 that Changes the Concept of Mails. Detailed Gmail Guide, PC Fan 13th Book No. 23 p. 15, Japan, Mainichi Communications, Oct. 15, 2006.

Japanese Search Report dated Sep. 26, 2016.

* cited by examiner

METHOD AND APPARATUS FOR MANAGING MESSAGE

CLAIM OF PRIORITY

This application claims the benefit under 35 U.S.C. §119(a) of a Korean patent application filed on Dec. 19, 2011 in the Korean Intellectual Property Office and assigned Serial No. 10-2011-0137165, the entire disclosure of which is hereby incorporated by reference.

BACKGROUND

Technical Field

The present disclosure relates generally to message management technology and, more particularly, to a method and apparatus for conveniently managing messages that are received from or sent to external devices through a network by a mobile device.

Description of the Related Art

The market for mobile communication devices is rapidly growing due to improvements in designs and applications that have garnered increasing consumer interest. The functionality of today's mobile devices has expanded to include a great variety of applications such as text and multi-media messaging, photography, video/audio recording, online gaming, broadcast reception, use of "apps" including social network service (SNS), and the like, downloaded from online markets, etc. Such applications allow creating or downloading various contents from a network. Additionally, mobile devices have a wireless communication unit for sending and receiving messages to and from external devices through a network, and also provide a method and apparatus for managing such a message.

Meanwhile, as the use of messaging services such as text and multi-media messaging and SNS increases nowadays, many types of messages are created and used. This requires a method and apparatus for conveniently managing messages. However, conventional approaches to managing messages provide only a function to arrange and display messages to the user. It is therefore difficult to access desired messages sent or received at a specific time.

SUMMARY

An aspect of the present disclosure is to provide a method and apparatus for easily managing messages that are created in a mobile device and downloaded through a network. Other aspects are to provide a method and apparatus for allowing a user to selectively mark and manage desired messages among various and numerous messages, for allowing a user to easily access originally related messages of the selectively managed messages, and for allowing a user to simply recognize detailed information about such messages from the accessed originally related messages.

According to one implementation, provided is a method for managing a message sent or received through a network, the method comprising: displaying at least one message; receiving a selection for one of the displayed at least one message; checking attribute information associated with the selected message in a message history database; and based on the checked attribute information, displaying a message related to the selected message.

According to another aspect of the present invention, provided is an apparatus for managing a message, the apparatus comprising: a memory unit configured to store a message history database that contains messages sent or received through a network and attribute information about the messages; a display unit configured to display at least one message stored in the memory unit; and a control unit configured to select one of the displayed at least one message, to check the attribute information about the selected message in the message history database, and based on the checked attribute information, to control a display of a message related to the selected message.

Other aspects, advantages, and salient features of the invention will become apparent to those skilled in the art from the following detailed description, which, taken in conjunction with the annexed drawings, discloses exemplary embodiments of the invention.

DETAILED DESCRIPTION

Figure 1:
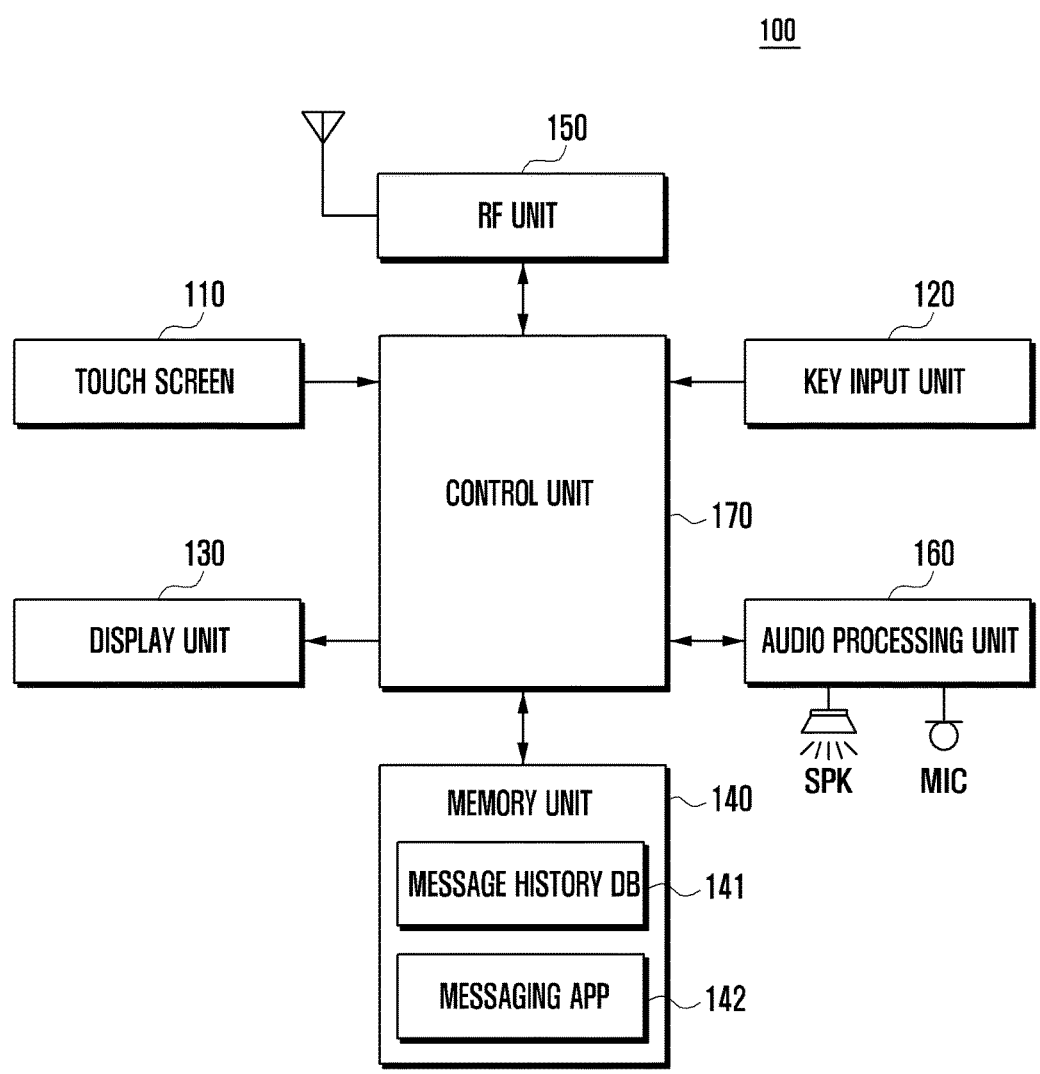
FIG. 1 is a block diagram illustrating a configuration of a mobile device in accordance with an embodiment of the present invention.

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

The words "may" and "can" are used herein to denote at least an optional element, feature, operation, function or characteristic, etc., of the described embodiment.

In this disclosure, a message means data sent to or received from any external device through a network. A message can include text, image, video, audio, multimedia, and the like. A "thread" or "message thread" refers to a series of related messages displayed in a sequence.

In this disclosure, a "messaging app" means an application for sending or receiving a message. A messaging app can be an SNS application such as Facebook® and Twitter®, an email service application, a chatting service application for one-to-one or group chatting, a message service application for sending or receiving text or multimedia messages, and the like.

In this disclosure, a "message history DB" (database) means a data file that contains messages and their attribute information. Here, the attribute information indicates attributes of a message such as link information, origin information, time information, location information, user input information, capacity information (e.g., number of bytes in the message), category information, and the like. Specifically, origin information means application information (e.g., the name of the application) as the origin of a message. That is, the origin is the application (i.e., Twitter®) which generated the message.

Link information means information about a target linked to a message. Here, the target may be data, web page information, or the like. Time information means communication time when a message is actually sent or received. Location information means information about the location of a mobile device when a message is sent or received. User input information refers to information about a message, which is inputted by a user. That is, user input information is distinct from the information of the original message itself. Examples of user input information may include title, memo, highlight, image, marking (also referred to as pin-up), link information inputted directly by a user, time information inputted directly by a user, location information inputted directly by a user, and the like.

In this disclosure, a "message view" (or a "thread view"), which is an execution screen of the above-discussed messaging app, means a display of arranged messages. Instead of messages, objects indicating such messages may be alternatively displayed in the message view. Here, the object may have the form of icon, thumbnail, or the like. A "mark view" means a display of arranged marked messages or a display of their indicating objects. Here, mark views may be classified by applications. For example, different mark views can be established for marked messages in connection with Facebook®, Twitter®, and an email service application. Alternatively, a mark view may be integrated regardless of applications. In the message view and/or the mark view, messages (or objects) may be arranged according to a specific or respective rule(s). For example, a display rule may be communication time when messages are sent or received through a network, i.e., a rule to display messages chronologically. Alternatively, a display rule may be by capacity, message type, or the like.

Implementations of a user-oriented message management method and apparatus according to the present invention may provide functionality such as a function to mark a message; a function to filter only marked messages from many messages and then display the filtered messages; and/or a function to reduce a scroll speed when a marked message appears during a scroll of message view. In some implementations, a function to allow an access to the origin of a marked message at any time is provided.

A method and apparatus for managing a message in accordance with the present invention may be applied to various types of mobile devices such as a mobile phone, a smart phone, a tablet PC (personal computer), a handheld PC, a PMP (portable multimedia player), a PDA (personal digital assistant), and the like.

FIG. 1 is a block diagram illustrating a configuration of a mobile device, 100, in accordance with an embodiment of the present invention. Mobile device 100 is an electronic device that may include a touch screen 110, a key input unit 120, a display unit 130, a memory unit 140, a radio frequency (RF) unit 150, an audio processing unit 160, a microphone (MIC), a speaker (SPK), and a control unit 170.

The touch screen 110, disposed on the front side of the display unit 130, generates a touch event in response to user's touch gesture on the screen surface and then delivers the touch event (an electrical signal) to the control unit 170. The control unit 170 may control the above elements by recognizing a user gesture from the touch event inputted from the touch screen 110. Such a user gesture may be classified into a touch and a touch gesture. Also, a touch gesture may include a tap, a double tap, a long tap, a drag, a drag-and-drop, a flick, a press, and so forth. A touch refers to user's action to cause a touch input tool (e.g., a finger or stylus pen) to contact any point on the screen. A tap refers to an action to touch any point on the screen and then release (i.e., "touch-off") a touch input tool from the touch point without moving the touch input tool. A double tap refers to an action to tap twice any point on the screen. A long tap refers to an action to touch relatively longer than a tap and then release a touch input tool from the touch point without moving the touch input tool. A drag refers to an action to move a touch input tool in an arbitrary direction while maintaining a touch on the screen. A drag-and-drop refers to an action to drag on a virtual object and then release the virtual object into a folder or the like on the screen. A flick refers to an action to move a touch input tool more quickly than a drag and then release the touch input tool. A press refers to an action to touch and push any point on the screen through a touch input tool. A touch can also be defined as a state of contact on the touch screen, and a touch gesture means a movement of touch from touch-on to touch-off. The touch screen 110 may be embodied with a pressure sensor to thereby detect a pressure on a touch point. Detected pressure information is delivered to the control unit 170, which may distinguish between a touch and a press on the basis of the detected pressure information. The touch screen 110 may use resistive type, capacitive type, electromagnetic induction type, and the like.

The key input unit 120 includes a plurality of input keys and function keys to receive user's input actions and to set up various functions. The function keys may have navigation keys, side keys, shortcut keys, and any other special keys defined to perform particular functions. Additionally, the key input unit 120 receives user's key manipulations for controlling the mobile device 100, creates corresponding key input signals, and then delivers them to the control unit 170. Such key input signals may include power on/off signals, volume regulating signals, screen on/off signals, and the like. In response to the key input signals, the control unit 170 controls the above elements. The key input unit 120 may be embodied with a mechanical keypad such as a QWERTY keypad, a 3*4 keypad, a 4*3 keypad, or any other suitable key arrangement. When the mobile device 100 supports the touch screen 110 in the form of full touch screen, the key input unit 120 may have only a side key(s), for power on/off or screen on/off, formed on any side of a device body without any key buttons or mechanical keypad.

The display unit 130 receives digital image signals from the control unit 170, and displays corresponding images with an analog appearance The display unit 130 may provide various screens such as a lock screen, a home screen, an application (hereinafter, will be shortened to 'app') executing screen, a menu screen, a keypad screen, an internet browser screen, and the like. The lock screen may be provided when the display unit 130 is activated. If a particular touch gesture for unlock is detected, the control unit 170 may change the lock screen into the home screen or the app executing screen. The home screen may contain a plurality of app icons corresponding to various apps. When one of the app icons is selected by a user, the control unit 170 may execute a corresponding app, e.g., a messaging app. Then the display unit 130 displays a specific executing screen, e.g., a message view or a mark view, for executing the selected app. Also, under the control of the control unit 170, the display unit 130 may display one of the above screens as a main screen and display one of the others as a sub screen overlapped with the main screen. For example, the display unit 130 may display a message view and also display a popup window for message treatment on the message view. The display unit 130 may be formed of any planar display panel such as LCD (liquid crystal display), OLED (organic light emitting diodes), AMOLED (active matrix OLED), or any other equivalent.

The memory unit 140 may store an operating system (OS) of the mobile device, various apps, and various data. The memory unit 140 may include a program region and a data region. The data region of the memory unit 140 may store data created in the mobile device 100 or received from an external source during the use of the mobile device, and also store attribute information that indicates the attributes of such data. Additionally, the data region may store the above-mentioned screens to be displayed on the display unit 130, and also temporarily store data copied for pasting. Furthermore, the data region may store various setting values (e.g., screen brightness) for operations of the mobile device, and also store a message history DB 141. The program region of the memory unit 140 may store the OS for booting and operating the mobile device 100, and various apps. Particularly, the program region may store a messaging app 142, which may have a function to select a message in a message view and to mark the selected message, a function to display a mark view in response to user input in a message view, a function to select a marked message in a mark view and to display a message view corresponding to the origin of the selected marked message, and a function to reduce a scroll speed when a marked message appears during a scroll of a message view.

The RF unit 150 performs a voice call, a video call, or a data communication under the control of the control unit 170. For this, the RF unit 150 may include an RF transmitter that up-converts the frequency of an outgoing signal and then amplifies the signal, and an RF receiver that amplifies with low-noise an incoming signal and down-converts the frequency of the signal. Also, the RF unit 150 may include a mobile communication module (e.g., a 3rd generation mobile communication module, a 3.5th generation mobile communication module, or a 4th generation mobile communication module, etc.), a short-distance communication module (e.g., a Wi-Fi module), and a digital broadcast module (e.g., a DMB module).

The audio processing unit 160 converts digital audio received from the control unit 170 into analog audio and then sends it to the speaker (SPK). Also, the audio processing unit 160 converts analog audio such as voice received from the microphone (MIC) into digital audio signals which are sent to the control unit 170.

The control unit 170 controls the overall operations of the mobile device 100, controls signal flows between elements of the mobile device 100, and processes data. Control unit 170 may control power supply from a battery to the various elements. Additionally, the control unit 170 may execute various kinds of apps stored in the program region. Particularly, the control unit 170 may include a message processing unit as shown in FIG. 2.

Figure 2:
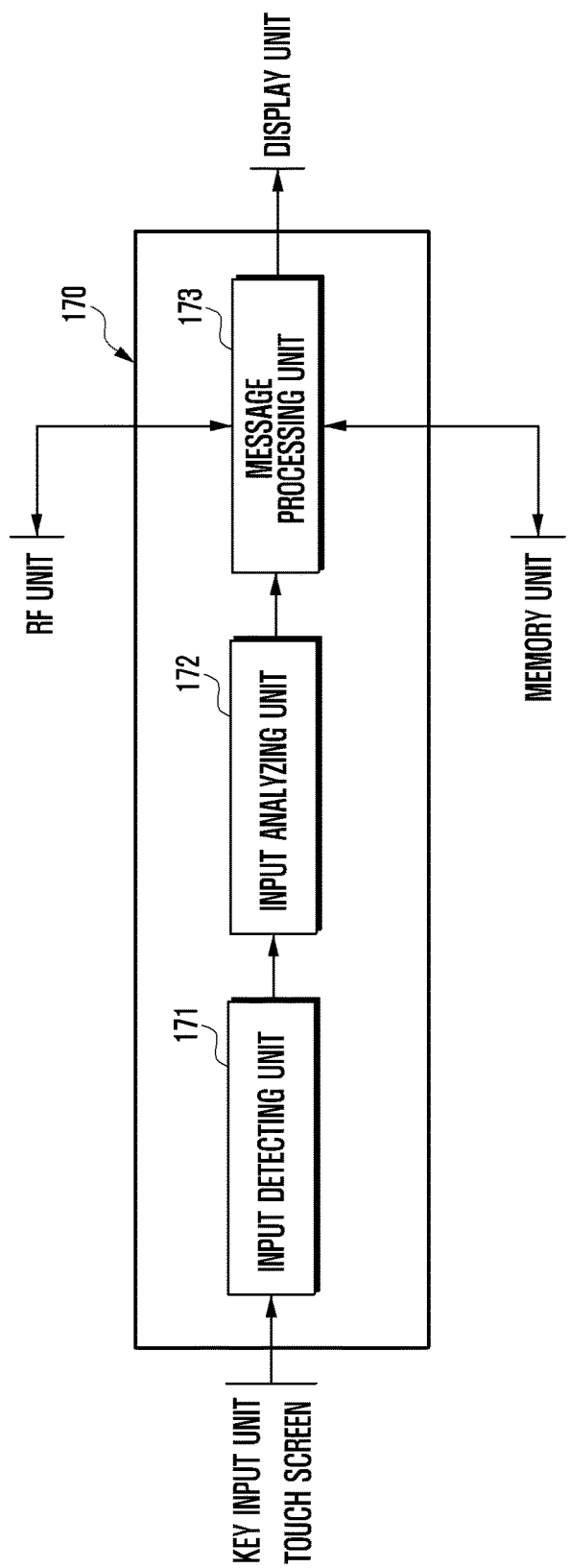
FIG. 2 is a block diagram illustrating a configuration of a control unit in accordance with an embodiment of the present invention.

FIG. 2 is a block diagram illustrating a configuration of a control unit in accordance with an embodiment of the present invention. As shown, the control unit 170 may include an input detecting unit 171, an input analyzing unit 172, and a message processing unit 173.

The input detecting unit 171 is connected to the touch screen 110 and the key input unit 120. The input detecting unit 171 detects user's touch gesture from the touch screen 110, detects user's key manipulation from the key input unit 120, and delivers user inputs such as the detected key manipulation and the detected touch gesture to the input analyzing unit 172. Specifically, the input detecting unit 171 may detect touch coordinates, the type of touch gesture, a moving direction of touch, and a moving distance of touch.

The input analyzing unit 172 performs a function to identify the detected user input. Specifically, the input analyzing unit 172 analyzes whether the user input is to request a marking, to request a display of a mark view, to request a display of a message view corresponding to the origin of a marked message, or to request a scroll of a message view. Then the input analyzing unit 172 delivers analysis results in connection with message processing to the message processing unit 173.

The message processing unit 173 may be connected to the RF unit 150 and the memory unit 140. The message processing unit 173 receives a message from the RF unit 150 or the memory unit 140, processes the received message for display, and delivers the processed message to the display unit 130. The message can be displayed by the display unit 130 in a message (thread) view, or in a mark view where only marked messages are displayed. Particularly, the message processing unit 173 receives the analysis results in connection with message processing from the input analyzing unit 172. Then, depending on the received analysis results, the message processing unit 173 may mark a message, control a display of a marked message, and store marking information in the memory unit 140. Screen examples of such operations will be presented below.

Also, depending on the received analysis results, the message processing unit 173 may control the display of a mark view. If a certain marked message is selected in the mark view, the message processing unit 173 may check origin information associated with the marked message in the message history DB 142 and control the display of a message view, i.e., an executing screen of the origin. Here, a message view may be displayed on the basis of time information (e.g., chronologically) of the selected marked message. That is, the display unit 130 may display, together with the marked message, other messages sent or received before or after the communication time of the marked message.

Additionally, the message processing unit 173 may check location information about a marked message in the message history DB 142, extract messages related to the location of the mobile device 100 from the message history DB 142 when the marked message is sent or received, and control a display of the extracted message. For example, suppose that a marked message is a user's photo taken at home and sent to friends. If the photo is marked and selected (for a further operation), the control unit 170 may display related messages, in this case, other messages sent to or received from friends at home but not yet marked. For instance, if a certain marked message is selected in a mark view, the message processing unit 173 may check the attribute information (specifically, link information, origin information, time information, location information, user input information, capacity information, category information, etc.) associated with the selected message and thereafter, based on the checked attribute information, control a display of messages associated with the selected marked message.

The message processing unit 173 may control a message view to be scrolled. That is, the message processing unit 173 may control the display unit 130 to change the display of messages by moving a message view, for example, up and down or from side to side. If a marked message appears on the screen during a scroll, the message processing unit 173 may automatically reduce a scroll speed so that a user can easily perceive the marked message. Staying time of the marked message on the screen, the speed reduction rate, or the like may be varied according to physical specification of the device, such as a screen size, and the type of the marked message. After the marked message scrolls off the screen, the message processing unit 173 may automatically increase the scroll speed.

According to a digital convergence tendency today, the mobile device 100 may essentially or selectively further include any other elements such as a sensor module for detecting information related to location variations of the mobile device, a GPS module for measuring the location of the mobile device, a camera module, and the like. Meanwhile, as will be understood by those skilled in the art, some of the above-mentioned elements in the mobile device 100 may be omitted or replaced with other elements. For instance, in addition to the touch screen 110 and the key input unit 120, the mobile device of this invention may further include a touch pad, a trackball, etc. as an input unit.

Now, example message management methods performed in the mobile device 100 will be described in detail with reference to FIGS. 3 to 6.

Figure 3:
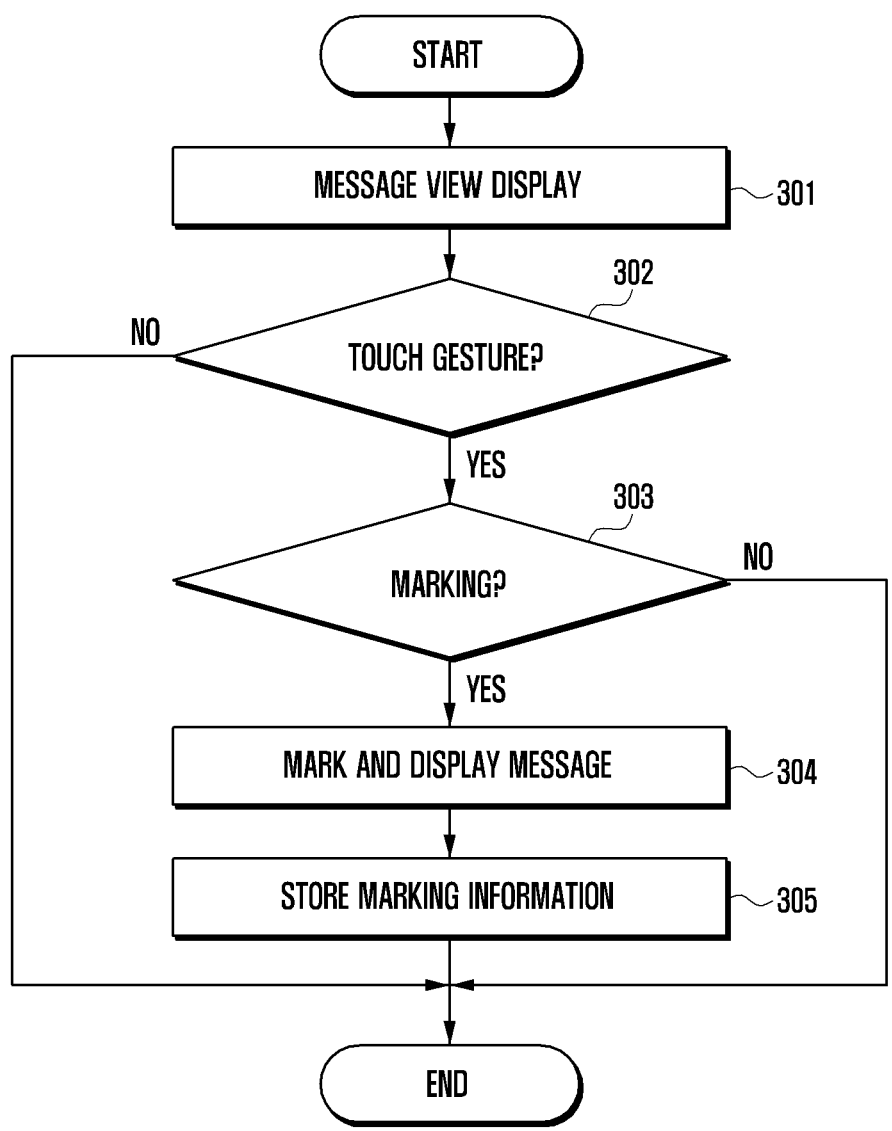
FIG. 3 is a flow diagram illustrating a method for marking a message in accordance with an embodiment of the present invention.

FIG. 3 is a flow diagram illustrating a method for marking a message in accordance with an embodiment of the present invention. At the outset, the display unit 130 may display a message view under the control of the control unit 170 (step 301). While the message view is displayed, the control unit 170 may detect a touch gesture (step 302). If no touch gesture is detected at 302, the control unit 170 may maintain a display of the message view. If a given time elapses without detection of any touch gesture after a display of the message view, the control unit 170 may turn off the screen of the display unit 130. If any touch gesture is detected in the step 302, the control unit 170 determines whether the detected touch gesture is a selection of the message to request a marking (step 303). In case of a request for a marking, the control unit 170 performs a marking on a selected message in the message view and controls the display unit 130 to display a marked message (step 304). Then the control unit 170 stores marking information in the memory unit 140 (step 305). (A screen example of the method of FIG. 3 is presented below in connection with FIG. 7.)

Figure 4:
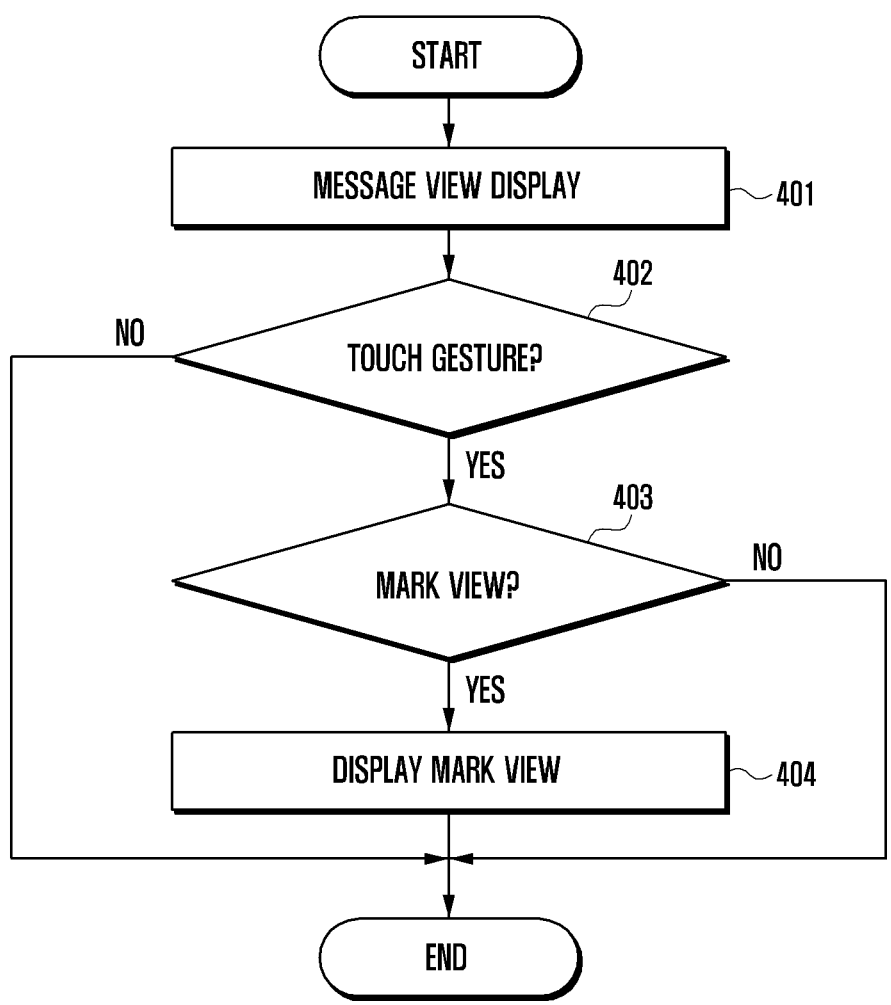
FIG. 4 is a flow diagram illustrating a method for displaying a mark view in accordance with an embodiment of the present invention.

FIG. 4 is a flow diagram illustrating a method for displaying a mark view in accordance with an embodiment of the present invention. At the outset, the display unit 130 may display a message view under the control of the control unit 170 (step 401). While the message view is displayed, the control unit 170 detects a touch gesture (step 402). If any touch gesture is detected in the step 402, the control unit 170 determines whether the detected touch gesture is a touch gesture that requests a display of a mark view (step 403). If a display of a mark view is requested, the control unit 170 controls the display unit 130 to display the mark view (step 404). That is, the current message view, in which the marked message is displayed with other messages that may not be marked (e.g., as in the original thread except with the marked message distinguished by marking), is changed to a mark view in which the marked message is displayed only with other, previously marked messages. (A screen example of the method of FIG. 4 is presented below in connection with FIG. 8.)

Figure 5:
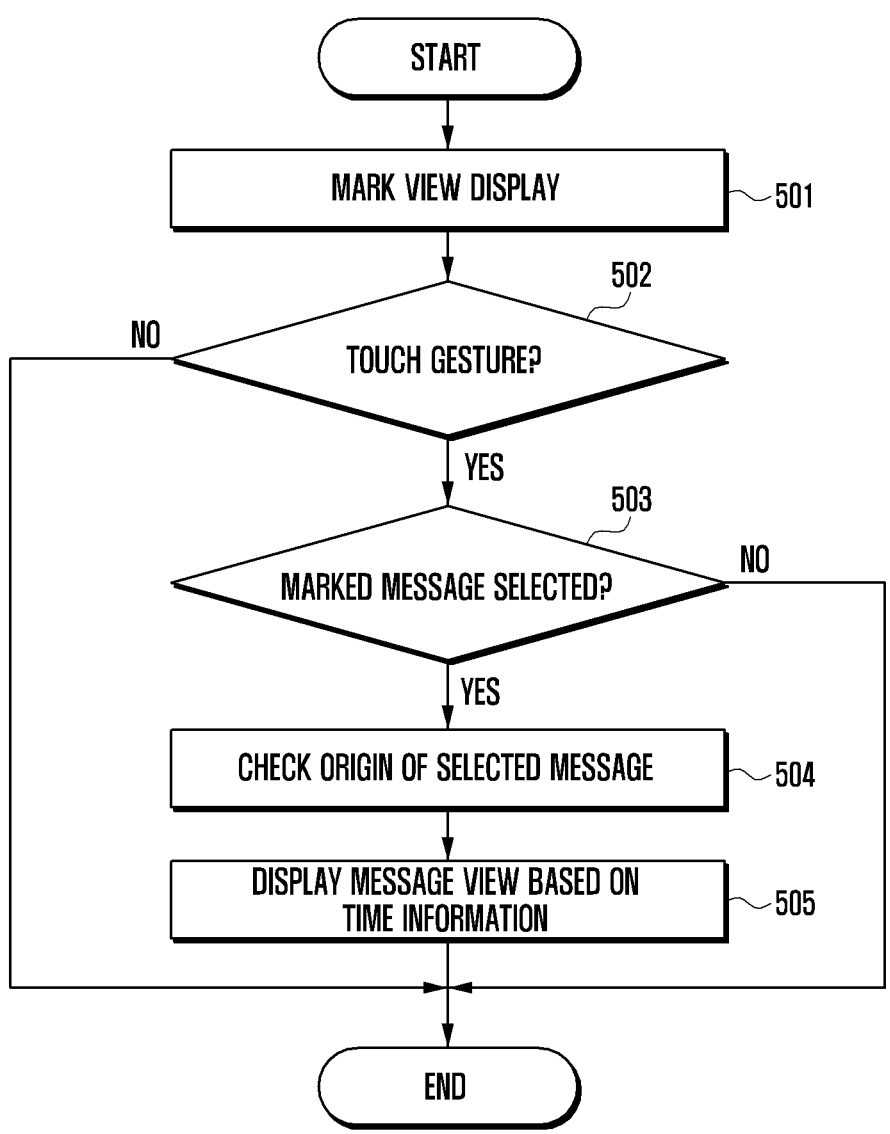
FIG. 5 is a flow diagram illustrating a method for displaying a message view in accordance with an embodiment of the present invention.

FIG. 5 is a flow diagram illustrating a method for displaying a message view in accordance with an embodiment of the present invention. More specifically, the method of FIG. 5 displays a message view following an initial display of a mark view, and user selection of a particular marked message. The method begins as the display unit 130 displays a mark view under the control of the control unit 170 (step 501). While the mark view is displayed, the control unit 170 detects a touch gesture (step 502). If any touch gesture is detected in step 502, the control unit 170 determines whether the detected touch gesture is a touch gesture that selects a marked message (step 503). If a marked message is selected, the control unit 170 checks the origin of the selected marked message by searching the message history DB 141 (step 504). Then the control unit 170 controls the display unit 130 to display a message view corresponding to the checked origin (step 505). Here, the message view may be displayed on the basis of time information of the selected marked message. (A screen example of the method of FIG. 5 is presented below in connection with FIG. 9.)

Figure 6:
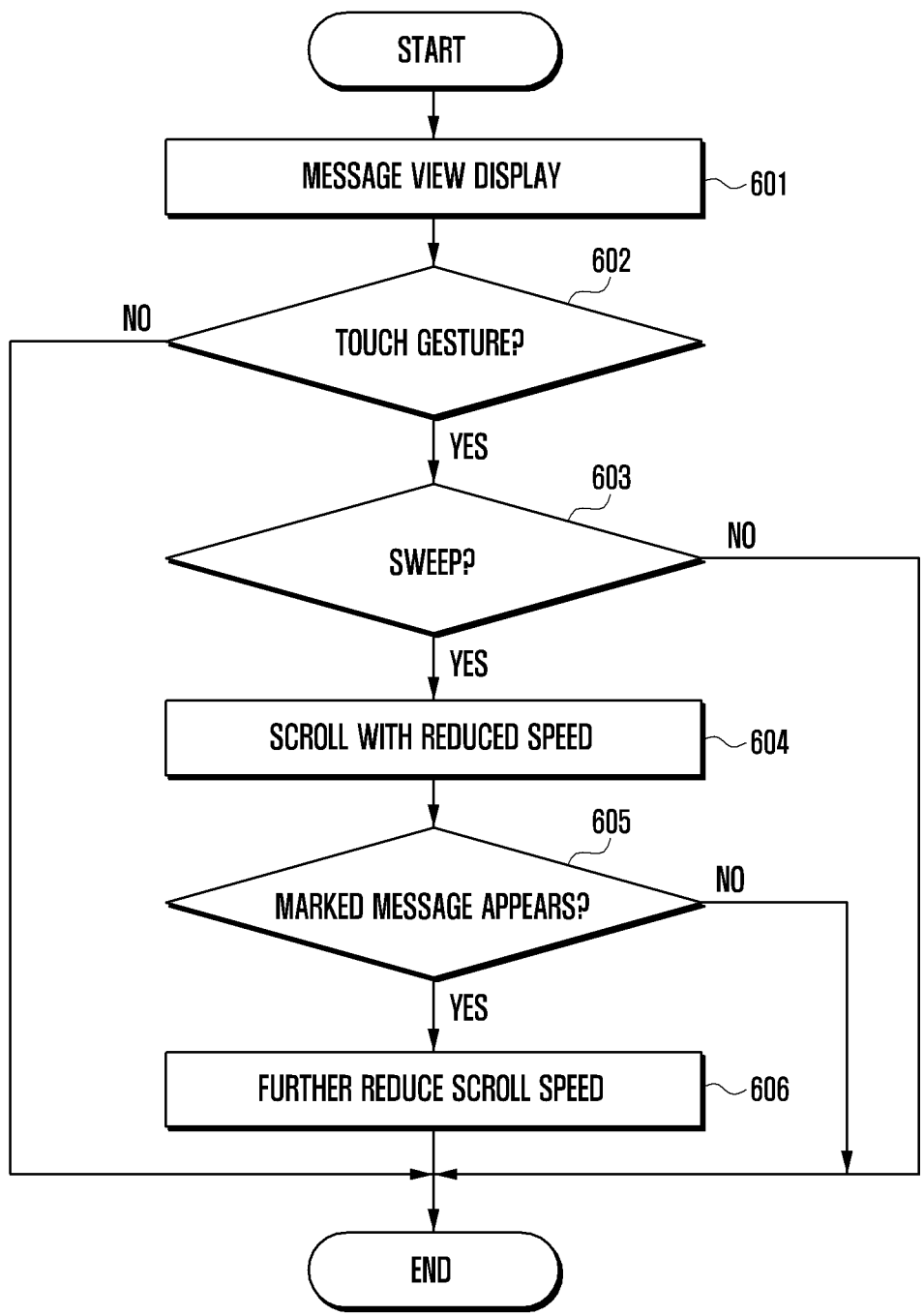
FIG. 6 is a flow diagram illustrating a method for scrolling a message view in accordance with an embodiment of the present invention.

FIG. 6 is a flow diagram illustrating a method for scrolling a message view in accordance with an embodiment of the present invention. The method starts with the display unit 130 displaying a message view under the control of the control unit 170 (step 601). While the message view is displayed, the control unit 170 detects a touch gesture (step 602). If any touch gesture is detected at 602, the control unit 170 determines whether the detected touch gesture is a touch gesture that requests a scroll of the message view (step 603). If the detected touch gesture is a sweep that requests a scroll of the message view, the control unit 170 controls the display unit 130 to scroll the message view according to direction and speed of the sweep (step 604). At this time, a scroll may be gradually reduced in speed and stopped. Alternatively, a scroll may be stopped at the end of the message view. While scrolled, the control unit 170 may determine whether a marked message appears on the screen (step 605). If any marked message appears, the control unit 170 may automatically reduce the scroll speed (step 606). Alternatively, in step 606, the control unit 170 may stop a scroll, regardless of speed, automatically as soon as a marked message appears in the screen. (A screen example of the method of FIG. 6 is presented below in connection with FIG. 11.)

Now, message management methods according to various embodiments will be described in more detail with reference to some screen representations.

Figure 7:
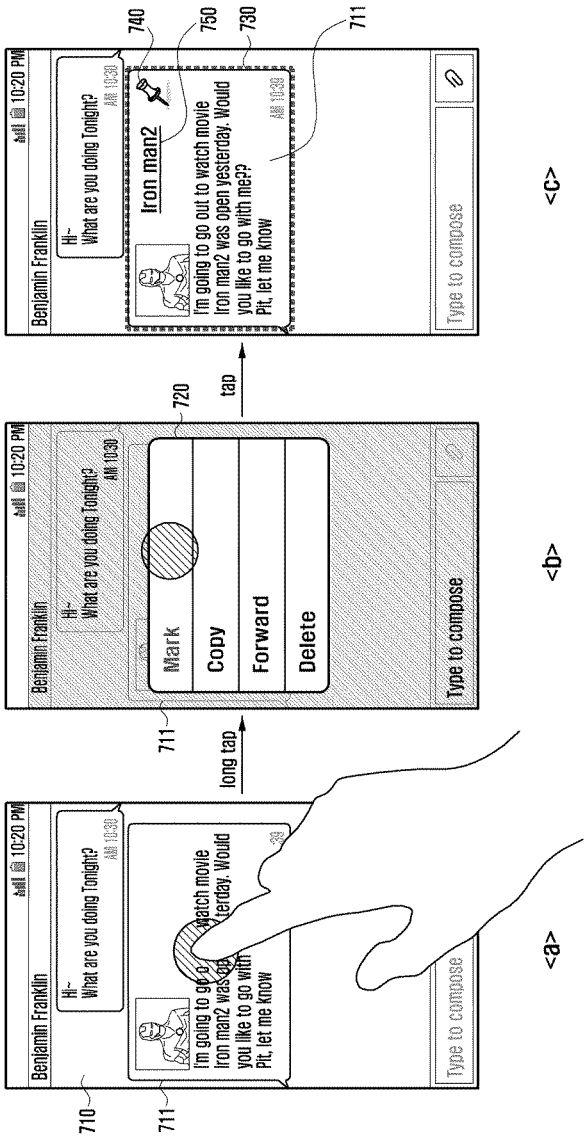
FIG. 7 is a screen representation illustrating a method for marking a message in accordance with an embodiment of the present invention.

FIG. 7 is a screen representation illustrating a method for marking a message in accordance with an embodiment of the present invention. Referring to stage (a) of FIG. 7, the display unit 130 may display a message view 710. While the message view 710 is displayed, a user may long tap a message 711 so as to "treat" the message 711, where the long tap is detected by the control unit 170. A message being "treated" refers to the message being designated for a further operation such as marking or copying the message to another location.

Referring to stage (b) of FIG. 7, when a long tap is detected on the message 711, the control unit 170 may control the display unit 130 to display a popup window 720 for treating the message 711 in an overlapped or superimposed form over the message view 710. As shown, the popup window 720 may contain a mark key, a copy key, a forward key, and a delete key (here, a "key" denotes a selectable menu item field or icon). While the popup window 720 is displayed, a user may tap the mark key to mark the message 711. When a tap on the mark key is detected, the control unit 170 marks the message 711 and may control the display unit 130 to display a marked message. Referring to stage (c) of FIG. 7, the display unit 130 displays a marking of the message 711 under the control of the control unit 170. This marking may have any distinguishing form such as an outline 730, an icon 740 (such as the illustrated thumbtack), a user's input tag 750, and the like. For instance, once the mark key is selected in (b), another window (not shown) may pop up which provides marking options to the user. Alternatively, the particular marking method may be selected beforehand in a settings menu or the like.

Figure 8:
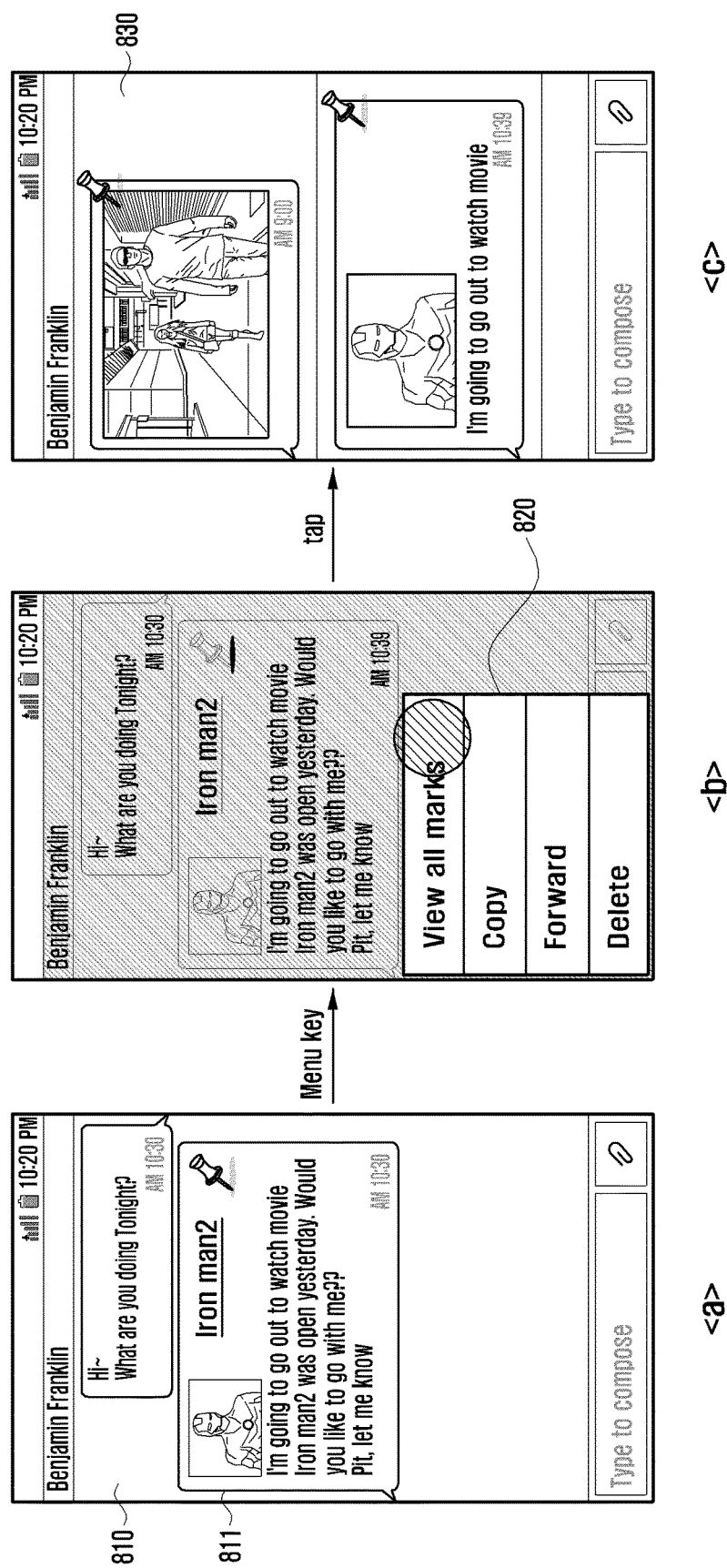
FIG. 8 is a screen representation illustrating a method for displaying a mark view in accordance with an embodiment of the present invention.

FIG. 8 is a screen representation illustrating a method for displaying a mark view in accordance with an embodiment of the present invention. Referring to stage (a) of FIG. 8, the display unit 130 may display a message view 810 having a marked message 811. In this state, a user may manipulate the touch screen 110 or the key input unit 120 so as to treat the marked message 811. For example, a user may long tap the marked message 811 or press a pre-designated menu key in the key input unit 120. When such user input is detected, the control unit 170 may control the display unit 130 to display a popup window 820 for treating the marked message 811 as shown in stage (b) of FIG. 8. As shown, the popup window 820 may contain a "view all marks" key, a copy key, a forward key, and a delete key. If a user taps the view all marks key, the control unit 170 controls the display unit 130 to display a mark view 830 as shown in stage (c) of FIG. 8. Specifically, the control unit 170 extracts only the marked messages from the message view 810. Then the control unit 170 controls the display unit 130 to display the mark view 830 containing all the extracted mark messages from the message view 810 Naturally, if many messages are marked, they may not all be displayable simultaneously in the mark view; the non-displayed messages may then be accessed by scrolling. Note also that the message view 810 may represent a thread between the user of the mobile device 100 and only one other third party. That is, the message view 810 may represent only one of many message views available for viewing in the mobile device 100. In this case, in another implementation or mode selection, executing the "view all marks" key may result in the marked messages of message view 810 appearing on mark view screen with marked messages from other threads as well.

Figure 9:
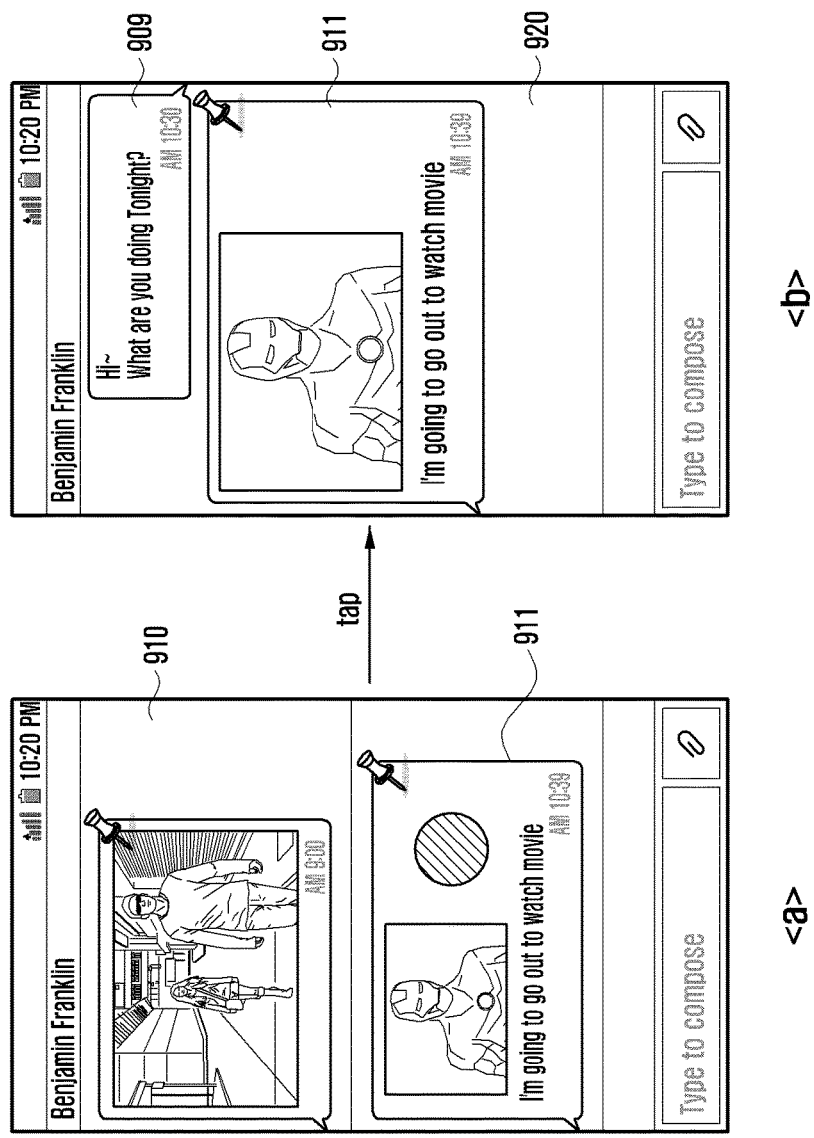
FIG. 9 is a screen representation illustrating a method for displaying a message view in accordance with an embodiment of the present invention.

FIG. 9 is a screen representation illustrating a method for displaying a message view in accordance with an embodiment of the present invention. Referring to stage (a) of FIG. 9, the display unit 130 may display a mark view 910. In this state, a user may desire a message view corresponding to the origin of a mark message 911. That is, the user desires the marked message 911 to be displayed in relation to at least one other message in a manner in which it was originally received or sent. For example, if a user taps the marked message 911, the control unit 170 may control the display unit 130 to display a message view 920 corresponding to the marked message 911 as shown in stage (b) of FIG. 9. Particularly, the control unit 170 may control a display of the message view 920 on the basis of time information of the marked message 911. Thus, an unmarked message 909 which originally preceded the marked message 911 chronologically, is displayed in the message view 920 directly above message 911. Hence, with this technique, the user may be able to recollect the context of the marked message, without the need to scroll through the original message thread to find the related messages. Note that one or more original (unmarked) messages chronologically subsequent to the marked message may also be displayed at stage (b).

Figure 10:
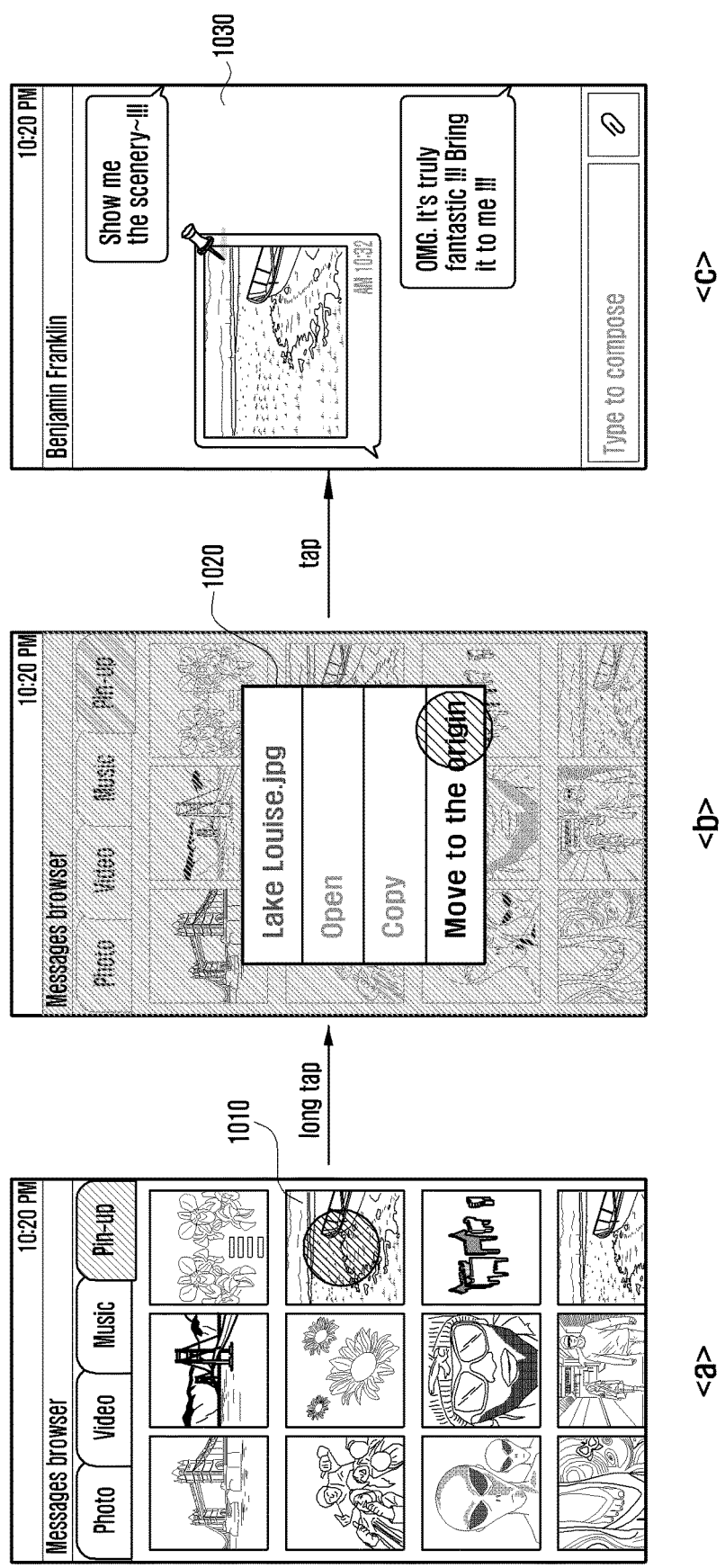
FIG. 10 is a screen representation illustrating a method for displaying a message view in accordance with another embodiment of the present invention.

FIG. 10 is a screen representation illustrating a method for displaying a message view in accordance with another embodiment of the present invention. Messages may be classified according to categories and managed in a message browser mode. For example, messages may be classified into messages containing photo, video, music, and "pin-up" as shown. Here, pin-up means a marked message among messages of a thread. That is, when a message of a message view is marked, it may be automatically placed in a pin-up album. Referring to stage (a) of FIG. 10, the display unit 130 may display the marked messages in a thumbnail form of a pin-up album. (Although the pin-up messages are shown as images, purely text messages may be included as well.) In this state, a user may long tap a marked message 1010 to be treated (designated for a subsequent operation). Referring to stage (b) of FIG. 10, when a long tap is detected on the marked message 1010, the control unit 170 may control the display unit 130 to display a popup window 1020 for treating the marked message 1010. (In this example, the marked message was moved from the original thread.) Here, the popup window 1020 may contain a title and format (e.g., Lake Louise.jpg), an open key for displaying the marked message 1010, a copy key, and a move key for moving the origin of the marked message 1010. If the move key is tapped in the popup window 1020, the control unit 170 searches the message history DB 141 and checks the origin of the marked message 1010. Then the control unit 170 controls the display unit 130 to display a message view 1030 of the checked origin as shown in stage (c) of FIG. 10. (If the marked message was merely copied to the pin-up album instead of being "cut" there, it might still exist in the original thread. In this case, it could be moved from the pin-up album to other locations desired by the user via suitable input commands.)

Figure 11:
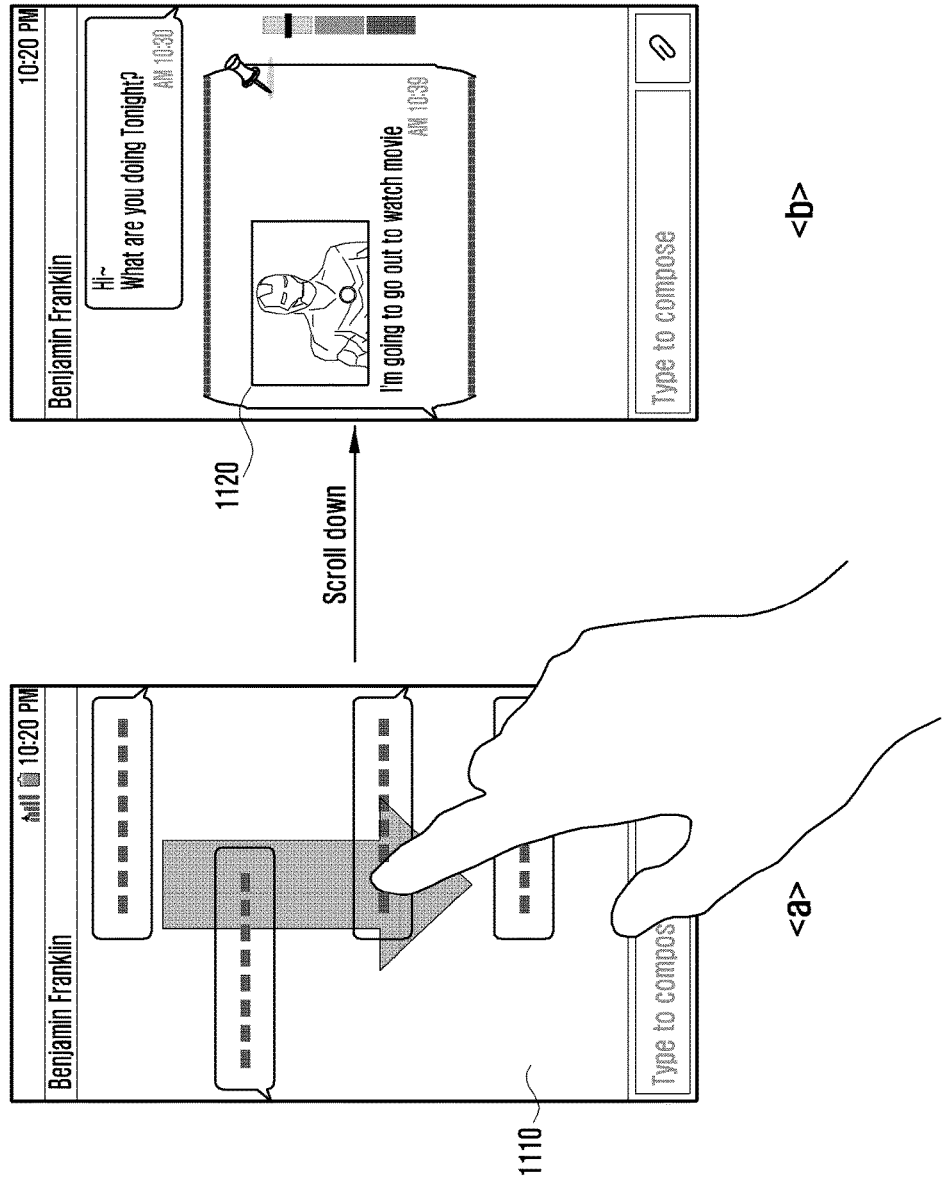
FIG. 11 is a screen representation illustrating a method for scrolling a message view in accordance with an embodiment of the present invention.

FIG. 11 is a screen representation illustrating a method for scrolling a message view in accordance with an embodiment of the present invention. Referring to stage (a) of FIG. 11, the display unit 130 displays a message view 1110. In this state, a user may scroll the message view 1110 by manipulating the touch screen 110 as illustrated by the shaded arrow. When a sweep is detected on the message view 1110, the control unit 170 controls the display unit 130 to scroll the message view 1110 according to direction and speed of the detected sweep. If a marked message 1120 appears on the screen during a scroll as shown in stage (b) of FIG. 11, the control unit 170 reduces a scroll speed or stops a scroll, depending upon a predetermined setting.

Embodiments of the present invention have been described herein with reference to flowchart illustrations of user interfaces, methods, and computer program products. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method operative in an electronic device, comprising:
    displaying, in a message view, a message thread for at least one of a chatting and texting application, the message thread corresponding to a particular contact including a plurality of messages transmitted to and received from the particular contact, the plurality of messages comprising marked messages or unmarked messages;
    receiving a touch input to a particular message in the message view;
    when the particular message is an unmarked message:
        displaying a first pop-up menu, the first pop-up menu comprising a first option selectable to mark the particular message and a list of other functions executable on the particular message, and
        in response to selection of the first option, setting the particular message as a marked message; and
    when the particular message is a marked message:
        displaying a second pop-up menu, the second pop-up menu comprising a second option selectable to activate a mark view and the list of other functions,
        in response to detecting activation of the second option, removing the unmarked messages from display and displaying the marked messages in a marked view, and
        in response to detecting selection of one of the displayed marked messages in the mark view, displaying the selected marked message and at least one unmarked message chronologically adjacent in the message thread to the selected marked message,
    wherein the first option and the second option are displayable to a same position relative to the list of other functions.

2. The method of claim 1, wherein the least one unmarked message chronologically adjacent in the message thread to the selected marked message is retrieved by checking attribute information including a communication time indicating a time of transmission or reception of the selected marked message.

3. The method of claim 2, wherein displaying the message thread comprises at least one of displaying a message sent or received before the communication time, and displaying a message sent or received after the communication time.

4. The method of claim 1, wherein the marked messages comprise objects including at least one of an icon and a thumbnail.

5. The method of claim 4, further comprising:
    in response to a scroll input, scrolling the message view; and
    executing at least one of reducing a speed of the scrolling and stopping the scrolling when a marked message or an object representing a marked message is displayed through the scrolling.

6. The method of claim 4, wherein the displaying the first pop-up menu comprises
    dimming visual display of the message thread to display the first pop-up menu including the first option selectable to mark the particular message; and
    in response to detecting the selection to the first option, removing the first pop-up menu from display, and undimming the message thread, and displaying the particular message including a highlight border and an icon to indicate that the particular message is marked.

7. The method of claim 1, wherein attribute information is associated with the selected marked message, and the attribute information includes at least one of time information indicating communication time when the selected marked message is sent or received, origin information indicating an origin of the selected marked message, link information indicating information about a target linked to the selected marked message, location information indicating information about a location when the selected marked message is sent or received, capacity information, category information, and user input information about the selected marked message inputted by a user.

8. The method of claim 1, wherein the displayed marked message includes at least one of text, audio, video and multimedia.

9. The method of claim 1, the method further comprising:
    displaying an album including a plurality of thumbnails, at least one thumbnail representing an image received or transmitted to the particular contact in the message thread, the plurality of thumbnails representing marked messages from a plurality of message threads; and in response to detecting an input to the at least one thumbnail, displaying the message thread in the message view for the particular contact, the message view including display of the image represented by the at least one thumbnail.

10. An apparatus, comprising:
a memory unit configured to store messages sent or received through a network, attribute information about the messages and marking information related to messages which are marked by a user input;
a display unit configured to display at least one message stored in the memory unit; and
a control unit configured to:
control the display unit to display, in a message view, a message thread for at least one of a chatting and texting application, the message thread corresponding to a particular contact including a plurality of messages transmitted to and received from the particular contact, the plurality of messages comprising marked messages or unmarked messages,
receive a touch input to a particular message in the message view,
when the particular message is an unmarked message:
control the display unit to display a first pop-up menu, the first pop-up menu comprising a first option selectable to mark the particular message and a list of other functions executable on the particular message, and
in response to selection of the first option, set the particular message as a marked message,
when the particular message is a marked message:
control the display unit to display a second pop-up menu, the second pop-up menu comprising a second option selectable to activate a mark view and the list of other functions,
in response to detecting activation of the second option, control the display unit to remove the unmarked messages from display, and display the marked messages in a marked view, and
in response to detecting selection of one of the displayed marked messages in the mark view, control the display unit to display the selected marked message and at least one unmarked message chronologically adjacent within the message thread to the selected marked message,
wherein the first option and the second option are displayable to a same position relative to the list of other functions.

11. The apparatus of claim 10, wherein the at least one unmarked message chronologically adjacent in the message thread to the selected marked message is retrieved for display by checking a communication time indicating a time of transmission or reception of the selected marked message in the memory unit, the at least one unmarked message related to the selected marked message as chronologically before or after the selected marked message in the message thread, as based on the communication time.

12. The apparatus of claim 11, wherein control of the display unit to display the message thread comprises at least one of displaying a message sent or received before the communication time and displaying a message sent or received after the communication time.

13. The apparatus of claim 10, wherein the marked messages comprise objects including at least one of an icon and a thumbnail.

14. The apparatus of claim 13, the control unit is further configured to:
when a marked message or an object is displayed during scrolling of the message view, execute at least one of reducing a scroll speed and stopping the scrolling.

15. The apparatus of claim 13, wherein control of the display unit to display the first pop-up menu further comprises:
dimming visual display of the message thread to display the first pop-up menu including the first option selectable to mark the particular message; and
in response to detecting the selection to the first option, removing the first pop-up menu from display, and undimming the message thread, and displaying the particular message including a highlight border and an icon to indicate that the particular message is marked.

16. The apparatus of claim 10, wherein attribute information is associated with the selected marked message, and the attribute information includes at least one of time information indicating communication time when the selected marked message is sent or received, origin information indicating an origin of the selected marked message, link information indicating information about a target linked to the selected marked message, location information indicating information about a location when the selected marked message is sent or received, capacity information, category information, and user input information inputted to the selected marked message by a user.

17. The apparatus of claim 10, wherein the displayed marked message includes at least one of text, audio, video and multimedia.

18. The apparatus of claim 10, the control unit further configured to:
display an album including a plurality of thumbnails, at least one thumbnail representing an image received or transmitted to the particular contact in the message thread, the plurality of thumbnails representing marked messages from a plurality of message threads; and
in response to detecting an input to the at least one thumbnail, display the message thread in the message view for the particular contact, the message view including display of the image represented by the at least one thumbnail.

19. A non-transitory computer-readable medium storing computer-executable instructions to cause an apparatus to:
display, in a message view, a message thread for at least one of a chatting and texting application, the message thread corresponding to a particular contact including a plurality of messages transmitted to and received from the particular contact, the plurality of messages comprising marked messages or unmarked messages;
receiving a touch input to a particular message in the message view;
when the particular message is an unmarked message:
control the display unit to display a first pop-up menu comprising a first option selectable to mark the particular message and a list of other functions executable on the particular message, and
in response to selection of the first option, setting the particular message as a marked message;
when the particular message is a marked message:
control the display unit to display a second pop-up menu, the second pop-up menu comprising a second option selectable to activate a mark view and the list of other functions,
in response to detecting activation of the second option, remove unmarked messages from display, and display marked messages in a marked view; and in response to detecting a selection of one of the displayed marked messages in the mark view, display the message thread for the particular contact including both the selected marked message and at least one unmarked message from the message thread chronologically adjacent to the selected marked message, wherein the first option and the second option are displayable to a same position relative to the list of other functions.

* * * * *